United States Patent
Hashimoto et al.

(10) Patent No.: US 6,610,426 B2
(45) Date of Patent: Aug. 26, 2003

(54) MAGNETIC RECORDING MEDIUM CONTAINING A BINDER OF TRIFUNCTIONAL OR HIGHER ALIPHATIC (METH) ACRYLATE COMPOUND

(75) Inventors: Hiroshi Hashimoto, Kanagawa (JP); Yuichiro Murayama, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 20 days.

(21) Appl. No.: 09/973,974

(22) Filed: Oct. 9, 2001

(65) Prior Publication Data

US 2002/0122957 A1 Sep. 5, 2002

(30) Foreign Application Priority Data

Oct. 12, 2000 (JP) ........................................ 2000-311457

(51) Int. Cl.$^7$ ................................................. B32B 5/16
(52) U.S. Cl. ........................ 428/694 BC; 428/694 BG; 428/900
(58) Field of Search .................. 428/694 BC, 694 BG, 428/900

(56) References Cited

U.S. PATENT DOCUMENTS

| 4,435,485 A | * | 3/1984 | Nakajima et al. |
| 4,699,844 A | * | 10/1987 | Okita et al. |
| 4,741,977 A | * | 5/1988 | Koga et al. |
| 5,140,486 A | * | 8/1992 | Yokoyama et al. |
| 5,523,115 A | * | 6/1996 | Haidos et al. |
| RE36,294 E | * | 9/1999 | Brehm et al. |

* cited by examiner

Primary Examiner—H. Thi Le
(74) Attorney, Agent, or Firm—Stroock & Stroock & Lavan LLP

(57) ABSTRACT

Provided is a magnetic recording medium achieving high durability, a high degree of smoothness, and a magnetic layer of uniform thickness, and having substantially better electromagnetic characteristics. A magnetic recording medium comprising a nonmagnetic layer comprising a nonmagnetic powder and at least one magnetic layer comprising a ferromagnetic powder and binder provided on a support in this order. The binder contained in the magnetic layer comprises at least a trifunctional or greater aliphatic acrylate compound having a molecular weight ranging from 250 to 1,000 or a trifunctional or greater aliphatic methacrylate compound having a molecular weight ranging from 250 to 1,000 that has been cured by exposure to radiation, and optionally followed by heat treatment. The compound is employed in a ratio of 5 to 30 mass parts per 100 mass parts of ferromagnetic powder.

18 Claims, No Drawings

MAGNETIC RECORDING MEDIUM CONTAINING A BINDER OF TRIFUNCTIONAL OR HIGHER ALIPHATIC (METH) ACRYLATE COMPOUND

FIELD OF THE INVENTION

The present invention relates to a magnetic recording medium for high-density recording comprising a ferromagnetic powder in a magnetic layer.

RELATED ART

In recent years, magnetic recording media in which a magnetic layer comprising a ferromagnetic powder dispersed in resin is provided on a nonmagnetic support have been employed as audio tapes, video tapes, floppy disks, and other magnetic recording media. A variety of characteristics are required of such magnetic recording media, such as electromagnetic characteristics, running durability, and running performance. To achieve good running durability, abrasives and lubricants are commonly added to the magnetic layer.

The magnetic recording medium comes into sliding contact with a magnetic head in the apparatus employed. Thus, the low-molecular-weight component in the binder employed in the magnetic recording medium rises up near the surface of the magnetic layer and adheres to the magnetic head. This is problematic in that the magnetic head is then dirtied. Dirtying of the magnetic head causes deterioration in electromagnetic characteristics. In particular, in high-density recording apparatuses, the magnetic heads rotate at high rpm. Even in home-use digital video tape recorders, the magnetic head rotates at 9,600 rpm. This is quite high relative to the 1,800 rpm of popular analog video recorders and the 5,000 rpms employed in industry. The sliding speed of the magnetic recording medium and the magnetic head becomes quite rapid and compact magnetic heads such as thin-film heads are employed. Thus, there is a need for improvement with regard to dirtying of the magnetic head by components produced by the magnetic recording medium. In particular, in the magnetic recording media employed for high-density recording employed in place of floppy disks, there is also a need for increased strength, improvement with regard to head dirtying, and high reliability.

In common, widely employed magnetic recording media, a thermoplastic resin such as vinyl acetate resin, vinyl chloride—vinylidene chloride resin, cellulose resin, acetal resin, urethane resin, or acrylonitrile butadiene resin is employed singly or in combination as the binder. However, magnetic layers employing these binders have drawbacks in the form of poor abrasion resistance and dirtying of the magnetic tape running path. The use of thermosetting resin such as phenol/formaldehyde resin, urea resin as the binder is known, as are binders that can be crosslinked by chemical reaction in which an isocyanate compound, epoxy compound, or the like, is added to the thermosetting resin. However, when a thermally cross-linking binder is employed, there are drawbacks in that the storage stability of the resin solution in which the magnetic powder is dispersed deteriorates, and the uniformity of magnetic coating liquid properties, and thus the homogeneity of the magnetic tape, are not maintained.

By contrast, Japanese Examined Patent Publication (KOKOKU) Heisei Nos. 3-6573 and 4-58650 disclose magnetic recording media employing binders that are crosslinked by irradiation with an electron beam employing compounds having a trifunctional urethane acrylic resin or (meth)acryloyl group. Because the crosslinking agent undergoes crosslinking when exposed to radiation, the problems caused by lack of storage stability in the above-described thermally crosslinking binder are not present and a magnetic recording medium with good electromagnetic characteristics and good durability can be obtained.

However, since the magnetic recording media described in Japanese Examined Patent Publication (KOKOKU) Heisei Nos. 3-6573 and 4-58650 are magnetic tapes with magnetic layers of single-layer structure, they are problematic in that they cannot adequately respond to current needs for the storage of large quantities of data. In light of such problems, for example, a magnetic recording medium (magnetic tape) provided with a lower nonmagnetic layer in which an inorganic nonmagnetic powder is dispersed in binder on a nonmagnetic support and a thin upper magnetic layer in which a ferromagnetic metal powder is dispersed in binder on the nonmagnetic layer has been proposed as a magnetic recording medium employed in a magnetic recording system with a built-in thin-film magnetic head (Japanese Unexamined Patent Publication (KOKAI) Heisei No. 8-227517). The upper magnetic layer is made thin to inhibit output dropoff due to thickness losses. Further, since a high recording density can be achieved, it is possible to store a greater quantity of data than on magnetic tapes having a single-layer structure magnetic layer.

However, the demands placed on high density magnetic recording media are continuously increasing, and there is a need for a magnetic recording medium having much greater durability than in the past as well as good electromagnetic characteristics. The achievement of high durability and good electromagnetic characteristics is being demanded of tapes such as video system tapes with extremely high recording densities such as DVC and DVC-PRO tapes, as well as computer backup tapes capable of the rapid transfer of large quantities of data such as DDS4 and LTO systems, and of disk systems in recording systems with recording and reproduction heads rotating at speeds of 700 rpm or greater, such as Zip and Zip250 systems.

To achieve such high level electromagnetic characteristics, these magnetic recording media are required to have an extremely thin magnetic layer of, for example, 0.05 to 0.2 $\mu$m, and extremely smooth surface roughness. Not only thin thickness, but also a high degree of uniformity is required for a magnetic layer because inadequate uniformity of thickness results in noise. As a particulate magnetic recording medium with such a magnetic layer, Japanese Unexamined Patent Publication (KOKAI) Heisei No. 10-222838 proposes a medium in which a thin magnetic layer is provided on a nonmagnetic layer and an isocyanate curing agent is employed in a nonmagnetic layer and a thin magnetic layer.

However, the characteristics of the magnetic recording medium described in Japanese Unexamined Patent Publication (KOKAI) Heisei No. 10-222838 are still inadequate in the recording systems requiring high durability and electromagnetic characteristics, as set forth above. That is, there is a demand for a magnetic recording medium achieving higher durability, a high degree of smoothness, a magnetic layer of uniform thickness, and extremely good electromagnetic characteristics.

SUMMARY OF THE INVENTION

Accordingly, an object of the present invention is to provide a magnetic recording medium achieving higher durability, a higher degree of smoothness, and a magnetic layer of more uniform thickness, and having substantially better electromagnetic characteristics than the magnetic recording medium described in Japanese Unexamined Patent Publication (KOKAI) Heisei No. 10-222838.

DETAILED EXPLANATION OF THE INVENTION

The first mode of the present invention relates to a magnetic recording medium comprising a nonmagnetic layer comprising a nonmagnetic powder and at least one magnetic layer comprising a ferromagnetic powder and binder provided on a support in this order, wherein the binder contained in the magnetic layer comprises at least a trifunctional or greater aliphatic acrylate compound having a molecular weight ranging from 250 to 1,000 or a trifunctional or greater aliphatic methacrylate compound having a molecular weight ranging from 250 to 1,000 that has been cured by exposure to radiation, and said compound being employed in a ratio of 5 to 30 mass parts per 100 mass parts of ferromagnetic powder.

In addition, the second mode of the present invention relates to a magnetic recording medium comprising a nonmagnetic layer comprising a nonmagnetic powder and at least one magnetic layer comprising a ferromagnetic powder and binder provided on a support in this order, wherein the binder contained in the magnetic layer comprises at least a trifunctional or greater aliphatic acrylate compound having a molecular weight ranging from 250 to 1,000 or a trifunctional or greater aliphatic methacrylate compound having a molecular weight ranging from 250 to 1,000 that has been cured by exposure to radiation followed by heat treatment, said compound being employed in a ratio of 5 to 30 mass parts per 100 mass parts of ferromagnetic powder.

In the first and second modes of the magnetic recording medium of the present invention, the aliphatic acrylate compound is desirably at least one compound selected from among the group consisting of pentaerythritol tetraacrylate, dipentaerythritol hexaacrylate, and dipentaerythritol pentacrylate, and the aliphatic methacrylate compound is desirably at least one compound selected from among the group consisting of pentaerythritol tetramethacrylate, dipentaerythritol hexamethacrylate, and dipentaerythritol pentamethacrylate.

In the first and second modes of the magnetic recording medium of the present invention, at least the magnetic layer comprises a binder employing a trifunctional or greater aliphatic acrylate compound with a molecular weight ranging from 250 to 1,000 or a trifunctional or greater aliphatic methacrylate compound with a molecular weight ranging from 250 to 1,000 (hereinafter, acrylate compounds and methacrylate compounds may be denoted as "(meth)acrylate compounds") that is cured by exposure to radiation. This (meth)acrylate compound, with a low molecular weight ranging from 250 to 1,000, has high solubility in solvents and low solution viscosity. Thus, it is possible to lower the viscosity of the magnetic coating liquid. Lowering the viscosity of the coating liquid yields a smooth coating because of the ease of leveling between coating and drying. However, the drop in viscosity leads to a drop in the dispersion stability of the magnetic powder in the coating liquid, resulting in a tendency for irregularities to form due to reaggregation of the magnetic powder. It is thus difficult to achieve a high degree of smoothness when a single magnetic layer 5 $\mu$m in thickness is coated (for example, see Japanese Examined Patent Publication (KOKAI) Heisei No. 4-58650). Particularly when employing the ultrafine particle magnetic powders with major axis lengths ranging from 0.1 to 0.03 $\mu$m of recent years, ensuring dispersion stability is quite difficult and it is impossible to achieve a smooth magnetic layer.

In the first and second modes of the magnetic recording medium of the present invention, it was found that when a thin magnetic layer ranging from 0.05 to 0.4 $\mu$m in thickness, for example, was coated on the nonmagnetic lower layer, a smooth magnetic layer was achieved because irregularities due to reaggregation of the magnetic powder did not occur due to a high shear force applied during coating. It was also found that when simultaneously multilayer was coated with a nonmagnetic lower layer, coating suitability was high and there was little variation in magnetic layer thickness.

It was also found that the (meth)acrylate compound used in the present invention is aliphatic and has a low molecular weight, has high compatibility with vinyl chloride binders and polyurethane binders, plasticizes the dried coating, and affords high formability of the magnetic layer in the calendering step following drying, thereby yielding a smoother magnetic layer with a higher fill rate of magnetic powder.

Since the (meth)acrylate compound is of low molecular weight and is trifunctional or greater, it yields a magnetic layer of high crosslink density, a high elastic modulus, and high heat resistance when calendered and cured by exposure to radiation or, preferably, an electron beam. Thus, a magnetic recording medium of extremely good durability can be obtained.

In the second mode of the present invention, a heat treatment is further applied following curing by exposure to radiation. This increases the molecular mobility of the whole binder system and further promotes the crosslinking reaction, thereby creating an extremely densely crosslinked structure and achieving an extremely strong coating.

Trifunctional or Greater Aliphatic (Meth)acrylate Compounds with a Molecular Weight of 250–1,000

This compound has a molecular weight ranging from 250 to 1,000, preferably from 300 to 1,000. When the molecular weight is less than 250 or exceeds 1,000, smoothness deteriorates. Further, the compound is trifunctional or greater, preferably having 4 to 8 functional groups. When the number of functional groups is equal to or less than two, there are problems in that the crosslink density is low and durability deteriorates.

The above-described aliphatic (meth)acrylate compound is, for example, an acrylate or methacrylate obtained by reacting a trifunctional or greater aliphatic alcohol with acrylic acid or methacrylic acid.

Specific examples of trifunctional aliphatic (meth)acrylate compounds that are suitable for use are: glycerin tri(meth)acrylate, trimethylolethane tri(meth)acrylate, trimethylolpropane tri(meth)acrylate, an ethylene oxide modified tri(meth)acrylate of trimethylolpropane, pentaerythritol tri(meth)acrylate, dipentaerythritol tri(meth)acrylate, propionic acid dipentaerythritol tri(meth)acrylate, and hydroxypivalylaldehyde-modified dimethylolpropane tri (methacrylate).

Specific examples of tetrafunctional or greater aliphatic (meth)acrylate compounds are: pentaerythritol tetra(meth) acrylate, ditrimethylolpropane tetra(meth)acrylate, dipentaerythritol tetra(meth)acrylate, dipentaerythritol penta (meth)acrylate, dipentaerythritol hexa(meth)acrylate, tripentaerythritol octa(meth)acrylate, tripentaerythritol hepta(meth)acrylate, and tripentaerythritol hexa(meth) acrylate.

These compounds may be employed singly or in combination.

Of these, tetrafunctional and greater acrylates are preferred. Pentaerythritol tetraacrylate, dipentaerythritol pentaacrylate, and dipentaerythritol hexaacrylate are even more preferable.

These aliphatic (meth)acrylate compounds are known compounds described in, for example, "UV•EB Curing Techniques" (published by Sogo Technical Center, K.K.) and "Application Techniques for Low-Energy Electron Beam Irradiation" (2000, published by CMC K.K.). These compounds are available as products from Nippon Kayaku K.K., Toa Gosei K.K., and Kyoeisha Kagaku K.K.

The aliphatic (meth)acrylate compounds are desirably employed in a proportion ranging from 5 to 30 mass parts, more preferably from 8 to 20 mass parts, per 100 mass parts of ferromagnetic powder. When the content of these compounds is less than 5 mass parts, it is difficult to achieve the desired effects (high C/N ratio, low surface roughness, good durability). At more than 30 mass parts, the magnetic powder fill rate decreases and magnetic characteristics deteriorate (the C/N ratio drops).

These compounds can be added to the nonmagnetic lower layer, and their addition to the nonmagnetic lower layer is desirable. The quantity added to the nonmagnetic lower layer preferably ranges from 5 to 30 mass parts, more preferably from 10 to 20 mass parts, per 100 mass parts of nonmagnetic powder. It is preferable that the quantity added falls within the stated range because high dispersibility and durability are imparted to the nonmagnetic lower layer and the electromagnetic characteristics of the magnetic recording medium obtained are good.

Radiation-Cured Compounds that can be Jointly Added

In the first and second modes of the present invention, known (meth)acrylate compounds described in "Application Techniques for Low-Energy Electron Beam Irradiation" (published by CMC) and "UV•EB Curing Techniques" (published by Sogo Technical Center, K.K.) may be used in conjunction with the above-described aliphatic (meth) acrylate compounds.

The Magnetic Layer and Nonmagnetic Layer Binders

In the first and second modes of the present invention, binders suitable for use are: polyurethane resin, polyester resin, polyamide resin, vinyl chloride resin, acrylic resins in which styrene, acrylonitrile, methyl methacrylate and the like have been copolymerized, cellulose resins such as nitrocellulose, epoxy resin, phenoxy resin, polyalkyral resins such as polyvinylacetal and polyvinylbutyral; these may be employed singly or multiple resins may be mixed for use. Of these, polyurethane resin, vinyl chloride resin, and acrylic resins are preferred.

To improve the dispersibility of the magnetic and nonmagnetic powders, functional groups (polar groups) adsorbing onto the powder surface are desirably present in the binder. Preferred functional groups are —$SO_3M$, —$SO_4M$, —$PO(OM)_2$, —$OPO(OM)_2$, —COOM, >$NSO_3M$, >$NRSO_3M$, —$NR^1R^2$, and —$N^+R^1R^2R^3X^-$. Here, M denotes hydrogen or an alkali metal such as Na or K; R denotes an alkylene group; $R^1$, $R^2$, and $R^3$ each denote alkyl groups, hydroxyalkyl groups, or hydrogen; and X denotes a halogen such as Cl or Br. From the perspective of dispersibility, the quantity of functional groups in the binder preferably ranges from 10 to 200 µeq/g, more preferably from 30 to 120 µeq/g.

Although functional groups capable of being cured by radiation are desirably imparted to the binder, the objects of the present invention are adequately achieved even without them. Preferred groups capable of radiation curing are (meth)acryloyl groups. A quantity of 50 µeq/g to 1 meq/g is preferred, with 100 to 800 µeq/g being still more preferred.

In addition, the binder may also comprise functional groups having active hydrogen, such as —OH groups.

The molecular weight of the binder is preferably a weight average molecular weight ranging from 20,000 to 200,000, more preferably from 20,000 to 80,000. Below this range, coating strength is inadequate and durability tends to decrease; above this range, viscosity increases and dispersibility tends to decrease.

The binder of preference, polyurethane resin, is described in detail, for example, in the "Polyurethane Resin Handbook" (ed. by IWATA, Keiji, 1986, Nikkan Kogyo Shinbun Co.). It is usually obtained by addition polymerization of long-chain diols and short-chain diols (sometimes also called chain-extending agents) to diisocyanate compounds. Examples of long-chain diols suitable for use are polyester diols, polyether diols, polyetherester diols, polycarbonate diols, and polyolefin diols with a molecular weight of 500 to 5,000. Depending on the type of long-chain diol, the polyurethane is referred to as polyester urethane, polyether urethane, polyetherester urethane, or polycarbonate urethane.

Polyester diols can be obtained by condensation polymerization of an aliphatic dibasic acid such as adipic acid, sebacic acid, or azelaic acid, or an aromatic dibasic acid such as isophthalic acid, orthophthalic acid, terephthalic acid, or naphthalene dicarboxylic acid with glycol. Examples of glycol components are ethylene glycol, 1,2-propylene glycol, 1,3-propane diol, 1,4-butane diol, 1,5-pentane diol, 3-methyl-1,5-pentanediol, 1,6-hexane diol, 2,2-dimethyl-1,3-propanediol, 1,8-octane diol, 1,9-nonane diol, cyclohexane diol, cyclohexane dimethanol, and bisphenol A hydride. Other polyester diols suitable for use are polycaprolactone diols and polyvalerolactone diols obtained by ring-opening polymerization of lactones such as ε-caprolactone and γ-valerolactone. From the perspective of resistance to hydrolysis, polyester diols having branching side chains obtained from aromatic and alicyclic starting materials are preferred.

Polyether diols include aromatic glycols and alicyclic diols such as polyethylene glycol, polypropylene glycol, polytetramethylene glycol, bisphenol A, bisphenol S, bisphenol P, and bisphenol A hydride to which alkylene oxides such as ethylene oxide and propylene oxide are combined by addition polymerization.

These long-chain diols may be combined and mixed for use.

Short-chain diols may be selected from among the same group of compounds as given by way of example for the glycol components of the above-described polyester diols. When a small quantity of a trifunctional or greater polyhydric alcohol such as trimethylolethane, trimethylolpropane, or pentaerythritol is combined, a branching structure polyurethane resin can be obtained and the solution viscosity lowered, and by increasing the terminal OH groups in the polyurethane, curing by isocyanate curing agents can be enhanced.

Diisocyanate compounds suitable for use are: aromatic diisocyanates such as MDI (diphenylmethane diisocyanate), 2,4-TDI (tolylene diisocyanate), 2,6-TDI, 1,5-NDI (naphthalene diisocyanate), TODI (tolidine diisocyanate), p-phenylene diisocyanate, and XDI (xylylene diisocyanate), aliphatic and alicyclic diisocyanates such as transcyclohexane-1,4-diisocyanate, HDI (hexamethylene diisocyanate), IPDI (isophorone diisocyanate), $H_6XDI$ (hydrogenated xylene diisocyanate) and $H_{12}$ MDI (hydrogenated diphenylmethane diisocyanate).

The preferred long-chain diol/short-chain diol/diisocyanate composition of the polyurethane resin is (80 to 15 weight percent)/(5 to 40 weight percent)/(15 to 50 weight percent).

The urethane group concentration in the polyurethane resin preferably ranges from 1 to 5 meq/g, more preferably from 1.5 to 4.5 meq/g. Below this range, mechanical strength is low. At excessively high quantity, the solution viscosity increases and dispersibility tends to decrease.

The glass transition temperature of the polyurethane resin preferably ranges from 0 to 200° C., more preferably from 40 to 160° C. Below this range, durability tends to decrease. When excessively high, calendering formability drops and electromagnetic characteristics tend to deteriorate.

The above-described adsorption functional groups (polar groups) and radiation-curing functional groups can be incorporated into the polyurethane resin by employing the functional group as a portion of the monomer of the long-chain diol, as a portion of the short-chain diol, or by incorporating polar groups with a polymeric reaction following polymerization of the polyurethane.

Vinyl chloride resin obtained by copolymerizing vinyl chloride monomer with various monomers can be employed. Compounds suitable for use as copolymerization monomers are fatty acid vinyl esters such as vinyl acetate and vinyl propionate; acrylates and methacrylates such as methyl (meth)acrylate, ethyl (meth)acrylate, isopropyl (meth)acrylate, butyl (meth)acrylate, and benzyl (meth)acrylate; alkylallylethers such as allylmethylether, allylethylether, allylpropylether, and allylbutylether; styrene; α-methylstyrene; vinylidene chloride; acrylonitrile; ethylene; butadiene; and acrylamide. Further compounds suitable for use as monomer for copolymerization having functional groups are vinyl alcohol, 2-hydroxyethyl (meth)acrylate, polyethyleneglycol (meth)acrylate, 2-hydroxypropyl (meth)acrylate, 3-hydroxypropyl (meth)acrylate, polypropyleneglycol (meth)acrylate, 2-hydroxyethylallylether, 2-hydroxypropylallylether, 3-hydroxypropylallyether, p-vinylphenol, maleic acid, maleic anhydride, acrylic acid, methacrylic acid, glycidyl (meth)acrylate, allylglycidylether, phosphoethyl (meth)acrylate, sulfoethyl (meth)acrylate, p-styrenesulfonic acid, and their Na salts and K salts, and the like.

The preferred content of vinyl chloride monomer in the vinyl chloride resin ranges from 60 to 95 weight percent. Within this range, mechanical strength does not decrease, solvent solubility does not drop, solvent viscosity does not increase, and dispersibility does not decrease; adhering to this range is thus desirable.

The preferred quantity of adsorption functional groups (polar groups) and radiation-curing functional groups is as stated above. These functional groups may be incorporated by copolymerization of the above-described functional-group comprising monomers or by incorporating functional groups by means of a polymeric reaction following copolymerization of the vinyl chloride resin. The preferred degree of polymerization ranges from 200 to 600, more preferably from 240 to 450. Within this range, mechanical strength does not decrease, solvent viscosity does not increase, and dispersability does not decreases; adhering to this range is thus desirable.

The addition amount of the binder preferably ranges from 5 mass parts to 30 mass parts, more preferably from 10 mass parts to 20 mass parts with respect to 100 mass parts of the magnetic material for magnetic layer and of the nonmagnetic powder for nonmagnetic layer.

The Thickness of the Magnetic and Nonmagnetic Layers

In the first and second modes of the present invention, the thickness of the magnetic layer desirably ranges from 0.01 to 1 μm, preferably from 0.05 to 0.4 μm. When excessively thin, a uniform recording layer is difficult to achieve. When excessively thick, the magnetic layer surface becomes rough and electromagnetic characteristics tend to deteriorate.

In the first and second modes of the present invention, the thickness of the nonmagnetic layer desirably ranges from 0.5 to 3 μm, preferably from 0.8 to 2 μm. When excessively thin, durability decreases. When excessively thick, the surface becomes rough and electromagnetic characteristics tend to deteriorate.

Magnetic Material

In the first and second modes of the present invention, a ferromagnetic alloy powder chiefly comprising α-iron is preferred as the ferromagnetic powder employed in the magnetic layer. In addition to prescribed atoms, the following atoms can be contained in the ferromagnetic powder: Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B and the like. Particularly, the incorporation of at least one of the following in addition to α-iron is desirable: Al, Si, Ca, Y, Ba, La, Nd, Co, Ni and B, further desirably Co, Y, Al. The Co content preferably ranges from 0 to 40 atom percent, more preferably from 15 to 35 atom percent, further preferably from 20 to 35 atom percent. The Y content preferably ranges from 1.5 to 12 atom percent, more preferably from 3 to 10 atom percent, further preferably from 4 to 9 atom percent. The Al content preferably ranges from 5 to 30 atom percent, more preferably from 5 to 15 atom percent, further preferably from 7 to 12 atom percent. These ferromagnetic powders may be pretreated prior to dispersion with dispersing agents, lubricants, surfactants, antistatic agents, and the like, described further below.

Specific examples are described in Japanese Examined Patent Publication (KOKOKU) Showa Nos. 44-14090, 45-18372, 47-22062, 47-22513, 46-28466, 46-38755, 47-4286, 47-12422, 47-17284, 47-18509, 47-18573, 39-10307, and 46-39639; and U.S. Pat. Nos. 3,026,215, 3,031,341, 3,100,194, 3,242,005, and 3,389,014.

The ferromagnetic alloy powder may contain a small quantity of hydroxide or oxide. Ferromagnetic alloy powders obtained by known manufacturing methods may be employed. The following are examples: methods of reduction with compound organic acid salts (chiefly oxalates) and reducing gases such as hydrogen; methods of reducing iron oxide with a reducing gas such as hydrogen to obtain Fe or Fe—Co particles or the like; methods of thermal decomposition of metal carbonyl compounds; methods of reduction by addition of a reducing agent such as sodium boron hydride, hypophosphite, or hydrazine to an aqueous solution of ferromagnetic metal; and methods of obtaining micropowder by vaporizing a metal in a low-pressure nonreactive gas. The ferromagnetic alloy powders obtained in this manner may be subjected to any of the known slow oxidation treatments, such as immersion in an organic solvent followed by drying; the method of immersion in an organic solvent followed by formation of an oxide film on the surface by feeding in an oxygen-containing gas, then drying; and the method of forming an oxide film on the surface by adjusting the partial pressure of oxygen gas and a inert gas without using an organic solvent.

The specific surface area as measured by the BET method of the ferromagnetic powder in the magnetic layer of the present invention ranges from 45 to 80 m$^2$/g, preferably from 50 to 70 m$^2$/g. Because noise increases at 40 m$^2$/g or less and good surface properties become difficult to achieve at 80 m$^2$/g or greater, it is not preferred. The crystalline size of the ferromagnetic powder of the magnetic layer ranges from 350 to 80 Å, preferably from 250 to 100 Å, more preferably from 200 to 140 Å. The major axis diameter of the ferromagnetic powder ranges from 0.02 to 0.25 μm, preferably from 0.05 to 0.15 μm, further preferably from 0.06 to 0.1 μm. The acicular ratio of the ferromagnetic powder preferably ranges from 3 to 15, further preferably from 5 to 12. The σs of the magnetic metal powder ranges from 100 to 180 A•m$^2$/kg (100 to 180 emu/g), preferably from 110 to 170 A•m$^2$/kg (110 to 170 emu/g), further preferably from 125 to 160 A•m$^2$/kg (125 to 160 emu/g). The coercive force of the metal powder preferably ranges from 111 to 279 kA/m (1400 to 3500 Oe), more preferably from 143 to 239 kA/m (1800 to 3000 Oe).

The moisture content of the ferromagnetic metal powder preferably ranges from 0.01 to 2 percent. The moisture content of the ferromagnetic powder is preferably optimized based on the type of binders employed. The pH of the ferromagnetic metal powder is preferably optimized based on the combination of binders employed. The range is from 4 to 12, preferably from 6 to 10. As needed, the surface of the ferromagnetic metal powder may be treated with Al, Si, P, or oxides thereof, and the like. The quantity thereof ranges from 0.1 to 10 weight percent with respect to the ferromagnetic metal powder. It is preferable that a surface treatment is applied, because the adsorption of lubricants such as fatty acids becomes equal to or less than 100 mg/$^2$. Inorganic ions of soluble Na, Ca, Fe, Ni, Sr, and the like are sometimes incorporated into the ferromagnetic metal powder. It is basically desirable that these not be present, but characteristics are not particularly affected when the quantity thereof is equal to or less than 200 ppm. Further, there are desirably few pores in the ferromagnetic metal powder employed in the present invention; the level thereof is equal to or less than 20 volume percent, preferably equal to or less than 5 volume percent. The shape may be acicular, rice-particle shaped, or spindle-shaped so long as the above-stated characteristics about particle size are satisfied. A low SFD of the ferromagnetic powder itself is desirable, and 0.8 or less is preferable. It is necessary to narrow the Hc distribution of the ferromagnetic powder. If the SFD is equal to or less than 0.8, the excellent electromagnetic characteristics and high output are achieved and magnetization reversal is sharp and peak shifts are small, which are suited to high density digital magnetic recording. Methods of narrowing the Hc include improving the particle size distribution of the goethite and preventing sintering between particles in the ferromagnetic metal powder.

In the first and second modes of the present invention, a hexagonal ferrite powder can be used as the ferromagnetic powder employed in the magnetic layer.

Various substitution products of barium ferrite, strontium ferrite, lead ferrite, calcium ferrite, and Co substitution products or the like can be employed as the hexagonal ferrite. Specific examples are magnetoplumbite-type barium ferrite and strontium ferrite, magnetoplumbite-type ferrite, the particle surface of which is covered with spinels, and composite magnetoplumbite-type barium ferrite and strontium ferrite partly containing a spinel phase. The following may be incorporated in addition to other prescribed atoms: Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and the like. Compounds to which elements such as Co—Ti, Co—Ti—Zr, Co—Ti—Zn, Ni—Ti—Zn, Nb—Zn—Co, Sb—Zn—Co and Nb—Zn have been added may generally also be employed. Specific impurities are also sometimes incorporated based on the starting materials and manufacturing method.

The particle size, measured as hexagonal plate diameter, ranges from 10 to 200 nm, preferably from 20 to 100 nm.

When conducting reproduction with a magnetic resistance (MR) head, a plate diameter equal to or less than 40 nm is desirable to reduce noise. However, a plate diameter equal to or less than 10 nm is undesirable because stable magnetization is difficult to achieve due to thermal fluctuation. At greater than 200 nm, noise increases. Neither of these cases is suited to high-density magnetic recording. A plate ratio (plate diameter/plate thickness) ranging from 1 to 15 is desirable, and from 2 to 7 is preferred. A low plate ratio is undesirable because packing in the magnetic layer increases, but making it difficult to achieve adequate orientation. Noise increases due to stacking between particles at a plate ratio of greater than 15. The specific surface area measured by BET method of this particle size ranges from 10 to 200 m$^2$/g. The specific surface area is generally coded as an arithmetic value calculated from the particle plate diameter and the plate thickness. The crystalline size ranges from 50 to 450 Å, preferably from 100 to 350 Å. A narrower distribution of the particle plate diameter and plate thickness is usually preferred. To assign a number is difficult, but comparison is possible by randomly measuring 500 particles in a TEM (transmission electron microscope) photograph of particles. Although the distribution is often not a normal distribution, when calculated and denoted as the standard deviation with respect to the mean size, it is given by σ/mean size=0.1 to 2.0. To achieve a sharp particle size distribution, the particle producing reaction system is rendered as uniform as possible and the particles produced may be subjected to a distribution-enhancing treatment. For example, one known method is the graded dissolution of ultrafine particles in an acid solution. The coercive force Hc measured in the magnetic material can be made about 39.8 to 398 kA/m (500 to 5000 Oe). Although a high Hc is advantageous to high-density recording, this is limited by the capacity of the recording head. It is usually from about 63.7 to 318 kA/m (800 to 4000 Oe), preferably from 119 to 279 kA/m (1500 to 3500 Oe). If the saturation magnetization of the head exceeds 1.4 T, 159 kA/m (2000 Oe) or greater is preferable. The Hc can be controlled through the particle size (plate diameter, plate thickness), type and quantity of elements contained, substitution site of elements, and the conditions under which the particle generating reaction is conducted. Saturation magnetization σs ranges from 40 to 80 A•m$^2$/kg (40 to 80 emu/g). A high σs is preferable, but the σs tends to decrease the smaller the particles become. One known method for improving σs is compounding magnetoplumbite-type ferrite with spinel ferrite, selecting kinds and addition amounts of the contained elements and the like. In addition, it is possible to employ W-type ferrite.

The magnetic material particle surface can be treated with a dispersion medium or substance suited to the polymer in the course of dispersing the magnetic material. An inorganic compound or organic compound is employed as the surface treatment agent. Representative examples such compounds include oxides or hydroxides of Si, Al, P and the like as well as various silane coupling agents and titanium coupling agents. For example, the quantity for treatment can range from 0.1 to 10% with respect to a magnetic material. The pH of the magnetic material is also important to dispersion. A pH ranging from about 4 to 12 is usually optimal for the dispersion medium and polymer, but a pH ranging from about 6 to 10 is selected for the chemical stability and storage properties of the medium. Moisture contained in the magnetic material also affects dispersion. Although there is an optimal value for the dispersion medium and polymer, 0.01 to 2.0 percent is normally selected. Methods of manufacturing hexagonal ferrite include: (1) a vitrified crystallization method consisting of mixing into a desired ferrite composition barium oxide, iron oxide, and a metal oxide substituting for iron with a glass forming substance such as boron oxide; melting the mixture; rapidly cooling the mixture to obtain an amorphous material; reheating the amorphous material; and refining and comminuting the product to obtain a barium ferrite crystal powder; (2) a hydrothermal reaction method consisting of neutralizing a barium ferrite composition metal salt solution with an alkali; removing the by-product; heating the liquid phase to 100° C. or greater; and washing, drying, and comminuting the product to obtain barium ferrite crystal powder; and (3) a coprecipitation method consisting of neutralizing a barium ferrite composition metal salt solution with an alkali; removing the by-product; drying the product and processing it at equal to or less than 1,100° C.; and comminuting the product to obtain barium ferrite crystal powder. However, any manufacturing method can be selected in the present invention.

Nonmagnetic Lower Layer

In the first and second modes of the present invention, the inorganic powder employed in the lower coated layer is a nonmagnetic powder. It may be selected from inorganic compounds, examples of which are: metal oxides, metal carbonates, metal sulfates, metal nitrides, metal carbides, metal sulfides and the like. Examples of inorganic compounds are α-alumina having an α-conversion rate equal to or higher than 90 percent, β-alumina, γ-alumina, θ-alumina, silicon carbide, chromium oxide, cerium oxide, α-iron oxide, goethite, corundum, silicon nitride, titanium carbide, titanium dioxide, silicon dioxide, tin oxide, magnesium oxide, tungsten oxide, zirconium oxide, boron nitride, zinc oxide, calcium carbonate, calcium sulfate, barium sulfate, and molybdenum disulfide; these may be employed singly or in combination. Particularly desirable due to their narrow particle distribution and numerous means of imparting functions are titanium dioxide, zinc oxide, iron oxide and barium sulfate. Even more preferred are titanium dioxide and α-iron oxide. The particle size of these nonmagnetic powders preferably ranges from 0.05 to 2 $\mu$m, but nonmagnetic powders of differing particle size may be combined as needed, or the particle diameter distribution of a single nonmagnetic powder may be broadened to achieve the same effect. What is preferred most is a particle size in the nonmagnetic powder ranging from 0.01 to 0.2 $\mu$m. Particularly when the nonmagnetic powder is a granular metal oxide, a mean particle diameter equal to or less than 0.08 $\mu$m is preferred, and when an acicular metal oxide, a major axis length equal to or less than 0.3 $\mu$m is preferred. The tap density ranges from 0.05 to 2 g/ml, preferably from 0.2 to 1.5 g/ml. The moisture content of the nonmagnetic powder ranges from 0.1 to 5 weight percent, preferably from 0.2 to 3 weight percent, further preferably from 0.3 to 1.5 weight percent. The pH of the nonmagnetic powder ranges from 2 to 11, and the pH between 5.5 to 10 is particular preferred. The specific surface area of the nonmagnetic powder ranges from 1 to 100 m$^2$/g, preferably from 5 to 80 m$^2$/g, further preferably from 10 to 70 m$^2$/g. The crystalline size of the nonmagnetic powder preferably ranges from 0.004 to 1 $\mu$m, further preferably from 0.04 to 0.1 $\mu$m. The oil absorption capacity using dibutyl phthalate (DBP) ranges from 5 to 100 ml/100 g, preferably from 10 to 80 ml/g, further preferably from 20 to 60 ml/100 g. The specific gravity ranges from 1 to 12, preferably from 3 to 6. The shape may be any of acicular, spherical, polyhedral, or plate-shaped.

It is considered that the ignition loss is desirably equal to or less than 20 weight percent, with no loss at all being most preferred. The Mohs' hardness of the above-mentioned nonmagnetic powder employed in the present invention is preferably equal to or higher than 4 and equal to or less than 10. The roughness factor of the powder surface preferably ranges from 0.8 to 1.5, more preferably from 0.9 to 1.2. The stearic acid (SA) adsorption amount of the nonmagnetic powders ranges from 1 to 20 $\mu$mol/m$^2$, preferably from 2 to 15 $\mu$mol/m$^2$, further preferably from 3 to 8 $\mu$mol/m$^2$. The heat of wetting in 25° C. water of the nonmagnetic powder is preferably within the range of 20 to 60 $\mu$J/cm (200 to 600 erg/cm$^2$). A solvent with a heat of wetting within this range may also be employed. The pH between 3 to 6 is preferred. The content of water-soluble Na of the nonmagnetic powder ranges from 0 to 150 ppm and that of water-soluble Ca ranges from 0 to 50 ppm.

The surface of these nonmagnetic powders is preferably treated with $Al_2O_3$, $SiO_2$, $TiO_2$, $ZrO_2$, $SnO_2$, $Sb_2O_3$, $ZnO$ and $Y_2O_3$. The surface-treating agents of preference with regard to dispersibility are $Al_2O_3$, $SiO_2$, $TiO_2$, and $ZrO_2$, and $Al_2O_3$, $SiO_2$ and $ZrO_2$ are further preferable. Depending on the objective, a surface-treatment coating layer with a coprecipitated material may also be employed, the coating structure which comprises a first alumina coating and a second silica coating thereover or the reverse structure thereof may also be adopted. These may be employed singly or in combination. Depending on the objective, the surface-treatment coating layer may be a porous layer, with homogeneity and density being generally desirable.

In the first and second modes of the present invention, specific examples of nonmagnetic powders suitable for use in the nonmagnetic lower layer are: Nanotite from Showa Denko K. K.; HIT-100 and ZA-G1 from Sumitomo Chemical Co., Ltd.; α-hematite DPN 250, DPN-250BX, DPN-245, DPN-270BX, DPN-SA1 and DPN-SA3 from Toda Kogyo Corp.; titanium oxide TTO-51B, TTO-55A, TTO-55B, TTO-55C, TTO-55S, TTO-55D, SN-100, α-hematite E270, E271, E300 and E303 from Ishihara Sangyo Co., Ltd.; titanium oxide STT-4D, STT-30D, STT-30, STT-65C, and α-hematite α-40 from Titan Kogyo K. K.; MT-100S, MT-100T, MT-150W, MT-500B, MT-600B, MT-100F, and MT-500HD from Tayca Corporation; FINEX-25, BF-1, BF-10, BF-20, and ST-M from Sakai Chemical Industry Co., Ltd.; DEFIC-Y and DEFIC-R from Dowa Mining Co., Ltd.; AS2BM and TiO2P25 from Nippon Aerogil; 100A and 500A from Ube Industries, Ltd.; and sintered products of the same. Particular preferable nonmagnetic powders are titanium dioxide and α-iron oxide.

Mixing carbon black into the lower layer achieves the known effects of lowering surface resistivity Rs and reducing light transmittance, as well as yielding the desired micro Vickers hardness. Further, the incorporation of carbon black into the lower layer can also serve to store lubricants. Examples of types of carbon black that are suitable for use are furnace black for rubber, thermal for rubber, black for coloring and acetylene black. Based on the effect desired, the following characteristics can be optimized in the carbon black in the lower nonmagnetic layer, and effects can be achieved by using different carbon blacks in combination.

The specific surface area of carbon black employed in the nonmagnetic lower layer ranges from 100 to 500 $m^2/g$, preferably from 150 to 400 $m^2/g$ and the DBP oil absorption capacity ranges from 20 to 400 ml/100 g, preferably from 30 to 200 ml/100 g. The particle diameter of carbon black ranges from 5 to 80 nm, preferably from 10 to 50 nm, further preferably from 10 to 40 nm. It is preferable for carbon black that the pH ranges from 2 to 10, the moisture content ranges from 0.1 to 10% and the tap density ranges from 0.1 to 1 g/ml. Specific examples of types of carbon black suitable for use in the present invention are: BLACK PEARLS 2000, 1300, 1000, 900, 800, 880, 700 and VULCAN XC-72 from Cabot Corporation; #3050B, #3150B, #3250B, #3750B, #3950B, #950, #650B, #970B, #850B, MA-600, MA-230, #4000 and #4010 from Mitsubishi Chemical Corporation; CONDUCTEX SC, RAVEN 8800, 8000, 7000, 5750, 5250, 3500, 2100, 2000, 1800, 1500, 1255 and 1250 from Columbia Carbon Co., Ltd.; and Ketjen Black EC from Lion Akzo Co., Ltd. The carbon black employed can be surface treated with a dispersing agent or the like, grafted with a resin, or a portion of the surface may be graphite-treated. Further, the carbon black may be dispersed with a binder prior to being added to the coating material. These types of carbon black are employed in a range that does not exceed 50 weight percent with respect to the inorganic powder above and does not exceed 40 percent with respect to the total weight of the nonmagnetic layer. These types of carbon black may be employed singly or in combination. The *Carbon Black Handbook* compiled by the Carbon Black Association may be consulted for types of carbon black suitable for use in the present invention.

Based on the objective, an organic powder may be added to the nonmagnetic lower layer. Examples are acrylic styrene resin powders, benzoguanamine resin powders, melamine resin powders, and phthalocyanine pigments. Polyolefin resin powders, polyester resin powders, polyamide resin powders, polyimide resin powders, and polyfluoroethylene resins may also be employed. The manufacturing methods described in Japanese Unexamined Patent Publication (KOKAI) Showa Nos. 62-18564 and 60-255827 may be employed.

As regards lubricants, dispersants, and additives; solvents; dispersion methods and the like of the nonmagnetic lower layer, the techniques known with regard to magnetic layers may be applied.

In the first and second modes of the present invention, the radiation that is employed to crosslink the binder with the above-described compound can be an electron beam or ultraviolet radiation. When employing ultraviolet radiation, a photopolymerization initiator is added to the above-described compound. Curing with an electron beam is preferred because a polymerization initiator is unnecessary and transmittance depth is considerable.

A scanning, double-scanning, or curtain beam type electron beam accelerator may be employed. However, the curtain beam type is preferred because high output can be achieved at relatively low cost. As regards electron beam characteristics, the accelerating voltage ranges from 30 to 1000 kV, preferably from 50 to 300 kV. The absorbed dose ranges from 0.5 to 20 Mrad (5 to 200 kGy), preferably from 2 to 10 Mrad (20 to 100 kGy). At an acceleration voltage of less than 50 kV, energy transmittance is inadequate, and at greater than 300 kV, the efficiency of energy employed in polymerization decreases, which is uneconomical. The atmosphere in which the electron beam is radiated is desirably reduced to an oxygen concentration of 200 ppm or less by means of a nitrogen purge. When the oxygen concentration is high, crosslinking and the curing reaction are blocked near the surface.

A mercury lamp is employed as the ultraviolet radiation source. A mercury lamp providing 20 to 240 W/cm is employed at a speed of 0.3 m/min to 20 m/min. Generally, a distance between the base and the lamp of 1 to 30 cm is preferred.

A photoradical polymerization initiator is employed as the photopolymerization initiator in ultraviolet radiation curing. As specific examples, those described in "New Polymer Experimentology, Vol. 2, Chapter 6, Light and Radiation Polymerization" (Kyoritsu Publishing, released in 1995, ed. by the Polymer Society) can be employed. Further specific examples are: acetophenone, benzophenone, anthraquinone, benzoinethylether, benzyl methyl ketal, benzyl ethyl ketal, benzoinisobutylketone, hydroxydimethylphenylketone, 1-hydroxycyclohexylphenylketone, and 2-2-diethoxyacetophenone. The mixing ratio of aromatic ketones ranges from 0.5 to 20 mass parts, preferably from 2 to 15 mass parts, and more preferably from 3 to 10 mass parts per 100 mass parts of compound having radiation-curing functional groups.

Known radiation curing devices and conditions, such as those described in "UV•EB Curing Techniques" (published by Sogo Technical Center, K.K.) and "Application Techniques for Low-Energy Electron Beam Irradiation" (2000, published by CMC K.K.) may be employed.

In the manufacturing of the magnetic recording medium of the first and second modes of the present invention, the magnetic layer is desirably provided on the nonmagnetic layer while the latter is still wet. That is, after the nonmagnetic layer coating liquid has been applied, the magnetic layer coating liquid is applied while the coating layer (nonmagnetic layer) that has been formed is still wet. The coating method known as the "wet-on-wet" technique is preferably employed to form the magnetic recording layer.

The following methods can be used for coating by the above-mentioned wet-on-wet technique;

(1) The method in which the nonmagnetic layer is first applied on a support with a coating device such as a gravure coating, roll coating, blade coating, or extrusion coating device, and the magnetic layer is applied while the nonmagnetic layer is still wet by means of a support pressure extrusion coating device, such as is disclosed in Japanese Unexamined Patent Publication (KOKAI) Showa No. 60-238179, Japanese Examined Patent Publication (KOKOKU) Heisei No. 1-46186 and Japanese Unexamined Patent Publication (KOKAI) Heisei No. 2-265672;

(2) The method in which the magnetic and nonmagnetic layers are applied nearly simultaneously on a support by a single coating head having two built-in slits for passing coating liquid, such as is disclosed in Japanese Unexamined Patent Publication (KOKAI) Showa No. 63-88080, Japanese Unexamined Patent Publication (KOKAI) Heisei No. 2-17921, and Japanese Unexamined Patent Publication (KOKAI) Heisei No. 2-265672;

(3) The method in which the magnetic and nonmagnetic layers are applied nearly simultaneously on a support using an extrusion coating apparatus with a backup roller, such as is disclosed in Japanese Unexamined Patent Publication (KOKAI) Hesei No. 2-174965.

In the present invention, the nonmagnetic and magnetic layers are preferably formed using a simultaneous multilayer coating method.

The exposure to radiation is desirably conducted after the nonmagnetic and magnetic layers have been coated, dried, and calendered. Prior to exposure to radiation, the magnetic layer is soft and more easily smoothened by calendering. When rolled up following calendering and stored for an extended period without having been exposed to radiation, irregularities in the back surface tend to be transferred to the front surface, rendering it rough. Accordingly, exposure to radiation is desirably conducted as quickly as possible following calendering to cure the magnetic layer. Calendering and exposure to radiation are preferably conducted in an integrated manner.

Heat Treatment

The heat treatment following curing by exposure to radiation in the second mode of the present invention will be described below.

The heat treatment temperature preferably ranges from 50 to 130° C., more preferably from 60 to 100° C. The heat treatment duration preferably ranges from 12 to 240 hr, more preferably from 24 to 120 hr. The higher the heat treatment temperature, or the longer the heat treatment duration, the greater the advance in the degree of curing following exposure of the magnetic layer to an electron beam and the more rigid the coating obtained. Remaining within the above-stated ranges is preferred because problems such as vaporization of lubricants and heat warping of the support do not occur. When the temperature is low or the heat treatment period is short, curing is inadequate and the increased durability effect is small. For example, a thermostatic oven or thermostatic chamber may be employed for heat treatment; there is no specific limitation. For example, following exposure to radiation, the web may be left rolled up and placed in a thermostatic chamber or oven for heat treatment. The web may also be slitted into tape form or punched into disk form and then heat treated. In this process, care must be taken to prevent heat warping the support.

The heat treatment polymerizes the unreacted (meth) acryloyl groups remaining after exposure to radiation, permitting the formation of a more densely crosslinked structure, yielding a coating of extremely high strength, and significantly improving durability.

Embodiments

The present invention is illustrated more in detail below through embodiments.

In the embodiments, 'parts' denotes 'mass parts'.

Embodiments 1 to 8 and Comparative Examples 1 to 4

Preparation of Magnetic Liquid for Upper Layer 100 parts of the ferromagnetic alloy powder A (composition (with respect to 100 atom percent of Fe): Co 20%, Al 9% and Y 6%, Hc 159 kA/m (2000 Oe), crystalline size 15 nm, specific surface area by BET method 59 m²/g, major axis diameter 0.09 µm, acicular ratio 7, σs 140 A·m²/kg (140 emu/g)) was grinded by an open kneader for 10 minutes. Then, 7.5 parts of vinyl chloride copolymer MR110 (manufactured by Nippon Zeon Co., Ltd.), 5 parts of polyurethane resin containing sulfonic acid UR8200 manufactured by Toyobo Co., Ltd (solid parts) and 60 parts of cyclohexanone were added and kneaded for 60 minutes. Next,

| | |
|---|---|
| α-alumina HIT55 (manufactured by Sumitomo Chemical Co., Ltd.) | 10 parts |
| Carbon black #50 (manufactured by Asahi Carbon Co., Ltd.) | 3 parts |
| Methyl ethyl ketone/Toluene = 1/1 | 200 parts | were added and dispersed by a sand mill for 120 minutes. Added were;

| Compound listed in Table 1 | addition amount described in Table 1 |
|---|---|
| Stearic acid | 1 parts |
| Oleic acid | 1 parts |
| 2-ethylhexyl myristate | 2 parts |
| Oleyl oleate | 1 parts |
| Methyl ethyl ketone | 50 parts |

The mixture was stirred and blended for another 20 minutes. Then, it was filtered using a filter having a mean pore diameter of 1 µm to prepare a magnetic coating liquid.

Preparation of Nonmagnetic Liquid for Lower Layer 85 parts of titanium dioxide (mean particle diameter; 0.035 µm, crystal type rutile, $TiO_2$ content; 90 percent or more, surface treatment layer; alumina, $S_{BET}$; 35-42 m²/g, true specific gravity; 4.1, pH; 6.5 to 8.0) and 15 parts of carbon black (Ketjen Black EC manufactured by Nippon EC) were grinded by an open kneader for 10 minutes. Then, 17 parts of vinyl chloride based copolymer MR 110 (manufactured by Nippon Zeon Co., Ltd.), 10 parts of polyurethane resin containing sulfonic acid UR8300 manufactured by Toyobo Co., Ltd (solid parts) and 60 parts of cyclohexanone were added and kneaded for 60 minutes. Next, Methyl ethyl ketone/cyclohexanone=6/4     200 parts were added and dispersed by a sand mill for 120 minutes. Added were;

| Compound listed in Table 1 | addition amount described in Table 1 |
|---|---|
| Stearic acid | 1 parts |
| Oleic acid | 1 parts |
| 2-ethylhexyl myristate | 2 parts |
| Oleyl oleate | 1 parts |
| Methyl ethyl ketone | 50 parts |

The mixture was stirred and blended for another 20 minutes. Then, it was filtered using a filter having a mean pore diameter of 1 µm to prepare a nonmagnetic coating liquid.

Simultaneous multilayer coating was conducted on an aramide base having a thickness of 3.8 µm by coating the nonmagnetic coating liquid in a quantity yielding a thickness of 1.2 µm and immediately applying magnetic coating liquid thereover in a quantity yielding a dry thickness of 0.10 µm.

While the two layers were both still wet, they were oriented with a magnetic field. After drying a solvent, a seven-stage calender was used under the condition of a rate of 100 m/min, a linear pressure of 300 kgf/cm and a temperature of 90° C. Then, electron beam with an accelerating voltage of 150 kV was radiated to the extent of the absorbed dose of 5 Mrad (50 kGy) in an atmosphere of an oxygen concentration of 200 ppm or less. Next, slits 6.35 mm in width were formed in the tape, and wound into a DVC cartridge.

Embodiments 9 to 16

Samples obtained by exposure to electron beam in the same condition as Embodiments 1 to 8 were further heat-treated at 80° C. for 3 days in a thermostatic chamber to prepare tape samples of Embodiments 9 to 16.

Comparative Example 5

Coating, drying and calendaring were done in the same manner as Embodiment 1 except that isocyanate curing agent (C-L) was used instead of the compound listed in Table 1. The sample was heat-treatment at 60° C. for 7 days without exposure of electron beam and slitted to prepare a tape sample.

Comparative Example 6

A tape sample was prepared in the same manner as Embodiment 4 except that a magnetic layer was directly coated on a support in a quantity yielding a thickness of 2.4 μm without coating a nonmagnetic lower layer.

The characteristics of the obtained tapes are shown in Table 1.

Measurement Methods (1) Electromagnetic Characteristics

Recording was conducted on sample tape using a drum tester at a recording wavelength of 0.5 μ, a head speed of 10 m/sec, and the recording was reproduced. The C/N ratio of the tape was evaluated relative to the C/N ratio of a reference tape (Comparative Example 5) that was assigned the value of 0 dB.

(2) Magnetic Layer Surface Roughness Ra

Optical interference method employing a digital optical profimeter (from WYKO) was used to measure the center-line average roughness Ra at a cutoff of 0.25 mm.

(3) and (4) Thickness of Magnetic Layer and Standard Deviation in Thickness (Thickness Variation)

Ultrathin sections of the tape were cut with a microtome in the direction of thickness and cross-section photographs were taken by transmission electron microscopy. The thickness of the magnetic layer was measured at 100 points in the cross-section photographs and the average and standard deviation thereof were calculated.

(5) Still Life (Life Time of Still Mode)

Using a DVC-VTR (NV-BJ1) from Matsushita Electric Industry Co.,Ltd., the output of a 60-minute length of tape was examined in still mode at 23° C. and 10 percent RH and the time required for the initial output to decrease by half was determined.

(6) Scratching Resistance

Using a scratch tester (diamond needle with a front-tip diameter of 0.1 mm) from Shinto Kagaku, the surface of the magnetic layer was scratched with a load of 30 g at a rate of 10 mm/sec, after which the depth of the scratch was measured.

TABLE 1

| | | Magnetic layer | | Nonmagnetic layer | | Electron | |
|---|---|---|---|---|---|---|---|
| | | Material (Molecular weight) | Addition amount | Material | Addition amount | beam exposure | Heat treatment |
| Embodiment | 1 | TMPA(296) | 12 | TMPA(296) | 12 | Done | None |
| Embodiment | 2 | PE4A(352) | 12 | PE4A(352) | 12 | Done | None |
| Embodiment | 3 | DPE5A(524) | 12 | DPE5A(524) | 12 | Done | None |
| Embodiment | 4 | DPE6A(578) | 12 | DPE6A(578) | 12 | Done | None |
| Embodiment | 5 | TPE8A(804) | 12 | TPE8A(804) | 12 | Done | None |
| Embodiment | 6 | DPE6A(578) | 5 | DPE6A(578) | 5 | Done | None |
| Embodiment | 7 | DPE6A(578) | 30 | DPE6A(578) | 30 | Done | None |
| Embodiment | 8 | DPE8A(804) | 12 | Not added | 0 | Done | None |
| Embodiment | 9 | TMPA(296) | 12 | TMPA(296) | 12 | Done | 80° C., 3 days |
| Embodiment | 10 | PE4A(352) | 12 | PE4A(352) | 12 | Done | 80° C., 3 days |
| Embodiment | 11 | DPE5A(524) | 12 | DPE5A(524) | 12 | Done | 80° C., 3 days |
| Embodiment | 12 | DPE6A(578) | 12 | DPE6A(578) | 12 | Done | 80° C., 3 days |
| Embodiment | 13 | TPE8A(804) | 12 | TPE8A(804) | 12 | Done | 80° C., 3 days |
| Embodiment | 14 | DPE6A(578) | 5 | DPE6A(578) | 5 | Done | 80° C., 3 days |
| Embodiment | 15 | DPE6A(578) | 30 | DPE6A(578) | 30 | Done | 80° C., 3 days |
| Embodiment | 16 | DPE8A(804) | 12 | Not added | 0 | Done | 80° C., 3 days |
| Comp.Ex. | 1 | DP2A(238) | 12 | DP2A(238) | 12 | Done | None |
| Comp.Ex. | 2 | PU2A(1300) | 12 | PU2A(1300) | 12 | Done | None |
| Comp.Ex. | 3 | DPE6A(578) | 3 | DPE6A(578) | 3 | Done | None |
| Comp.Ex. | 4 | DPE6A(578) | 40 | DPE6A(578) | 40 | Done | None |
| Comp.Ex. | 5 | C-L | 12 | C-L | 12 | None | 60° C., 7 days |
| Comp.Ex. | 6 | DPE6A(578) | 12 | Nonmagnetic layer was not provided. | | Done | None |

| | | (1) C/N | (2) Surface roughness Ra(nm) | (3) Magnetic layer thickness(μm) | (4) Standard deviation of magnetic layer thickness (μm) | (5) Still life (min) | (6) Scratching resistance (depth of scrach; nm) |
|---|---|---|---|---|---|---|---|
| Embodiment | 1 | 2.1 | 2.2 | 0.10 | 0.03 | 120 or more | |
| Embodiment | 2 | 2.6 | 1.8 | 0.10 | 0.03 | 120 or more | |

TABLE 1-continued

| | | | | | | | |
|---|---|---|---|---|---|---|---|
| Embodiment | 3 | 2.4 | 1.9 | 0.10 | 0.03 | 120 or more | |
| Embodiment | 4 | 2.5 | 1.9 | 0.10 | 0.03 | 120 or more | |
| Embodiment | 5 | 2.6 | 1.9 | 0.10 | 0.03 | 120 or more | |
| Embodiment | 6 | 2.1 | 2.1 | 0.10 | 0.03 | 120 or more | |
| Embodiment | 7 | 2.0 | 2.3 | 0.10 | 0.03 | 120 or more | |
| Embodiment | 8 | 2.0 | 2.3 | 0.10 | 0.03 | 120 or more | |
| Embodiment | 9 | 2.0 | 2.5 | 0.10 | 0.03 | 120 or more | 10 |
| Embodiment | 10 | 2.5 | 1.9 | 0.10 | 0.03 | 120 or more | 4 |
| Embodiment | 11 | 2.3 | 2.0 | 0.10 | 0.03 | 120 or more | 5 |
| Embodiment | 12 | 2.4 | 2.0 | 0.10 | 0.03 | 120 or more | 5 |
| Embodiment | 13 | 2.4 | 2.0 | 0.10 | 0.03 | 120 or more | 8 |
| Embodiment | 14 | 2.1 | 2.2 | 0.10 | 0.03 | 120 or more | 15 |
| Embodiment | 15 | 1.8 | 2.4 | 0.10 | 0.03 | 120 or more | 2 |
| Embodiment | 16 | 1.9 | 2.3 | 0.10 | 0.03 | 120 or more | 10 |
| Comp.Ex. | 1 | 0.8 | 3.4 | 0.10 | 0.05 | 4 | 60 |
| Comp.Ex. | 2 | 0.2 | 3.6 | 0.10 | 0.06 | 3 | 75 |
| Comp.Ex. | 3 | 0.0 | 3.4 | 0.10 | 0.06 | 32 | 45 |
| Comp.Ex. | 4 | 0.2 | 2.9 | 0.10 | 0.06 | 120 or more | 35 |
| Comp.Ex. | 5 | 0.0 | 4.0 | 0.10 | 0.07 | 30 | 67 |
| Comp.Ex. | 6 | −2.5 | 4.3 | 2.40 | 0.15 | 120 or more | 42 |

In Table 1, TMPA denotes trimethylolpropane triacrylate, PE4A denotes pentaerythritol tetraacrylate, DPE5A denotes dipentaerythritol pentaacrylate, DPE6A denotes dipentaerythritol hexaacrylate, TPE8A denotes tripentaerythritol octaacrylate, DP2A denotes dipropyleneglycol diacrylate, PU2A denotes urethane acrylate oligomer (trifunctional, MW1300), C-L denotes a tolylene diisocyanate 3 mole adduct of trimethylolpropane.

In Table 1, Embodiments 1 to 8 are magnetic tapes of the first mode of the present invention and Embodiments 9 to 16 are magnetic tapes of the second mode of the present invention.

The results in Table 1 reveal that when a radiation-crosslinking binder with a greater than trifunctional aliphatic (meth)acrylate compound was employed in the magnetic layer, as indicated by Embodiments 1 to 8, a high C/N ratio was achieved and a magnetic recording medium with low surface roughness, good uniformity of magnetic layer thickness, and good still life was obtained. The above-described binder was employed in both the magnetic layer and the nonmagnetic layer in Embodiments 1 to 7, but in Embodiment 8, it was employed in just the magnetic layer. However, even in Embodiment 8, a high C/N ratio was achieved and a magnetic recording medium with low surface roughness, good uniformity of magnetic layer thickness, and good still life was obtained.

Embodiments 9 to 16 are magnetic tapes obtained by subjecting the magnetic tapes of Embodiments 1 to 8 to an additional three-day heat treatment at 80° C. following curing by exposure to an electron beam. A high C/N ratio was achieved and a magnetic recording medium with low surface roughness, good uniformity of magnetic layer thickness, and good still life was obtained. Embodiments 9 to 16 had much better scratching resistance than Comparative Examples 1 to 4 which were not heat treated, Comparative Example 5 which was not exposed to an electron beam, and Comparative Example 6, which had no nonmagnetic lower layer.

By contrast, Comparative Example 1 is an example in which an aliphatic diacrylate DP2A with a low molecular weight (MW 238) falling outside the range of the present invention was employed. The C/N ratio, surface roughness, uniformity of magnetic layer thickness, and still life were all inferior to those of the embodiments.

Comparative Example 2 is an example described in Japanese Examined Patent Publication (KOKOKU) Heisei No. 3-6573 in which PU2A (trifunctional, MW 1,300), a urethane acryloligomer, was employed. The C/N ratio, surface roughness, uniformity of magnetic layer thickness, and still life were all inferior to those of the embodiments.

Comparative Examples 3 and 4 are examples in which the quantities of trifunctional or greater aliphatic (meth)acrylate compounds employed were outside the range of the present invention. In Comparative Example 3, the C/N ratio, surface roughness, uniformity of magnetic layer thickness, and still life were all inferior to those of the embodiments. In Comparative Example 4, the still life was comparable to that of the embodiments, but the C/N ratio, surface roughness, uniformity of magnetic layer thickness, and scratching resistance were all inferior to those of the embodiments.

Comparative Example 5 is an example described in Japanese Unexamined Patent Publication (KOKAI) Heisei No. 10-222838 in which a tolylene diisocyanate 3 mole adduct of heat crosslinking trimethylolpropane (C-L) was employed as the crosslinking agent. The C/N ratio, surface roughness, uniformity of magnetic layer thickness, still life, and scratching resistance were all inferior to those of the embodiments.

Comparative Example 6 is an example of a magnetic recording medium with a single magnetic layer and no nonmagnetic layer described in Japanese Examined Patent Publication (KOKOKU) Heisei No. 4-58650. Although the still life was comparable to that of the embodiments, the C/N ratio, surface roughness, uniformity of magnetic layer thickness, and scratching resistance were all inferior to those of the embodiments. In particular, the C/N ratio was extremely low.

According to the present invention, a magnetic recording medium, in which (1) electromagnetic characteristics are improved, (2) thickness variation of magnetic layer is reduced and noises can be reduced, (3) suitability for simultaneous multilayer coating of the magnetic and nonmagnetic layers is improved and smoothness of coating film can be improved and (4) durability is improved, can be provided.

The present disclosure relates to the subject matter contained in Japanese Patent Application No. 2000-311457 filed on Oct. 12, 2000 and Japanese Patent Application No. 2001-58103 filed on Mar. 2, 2001, which is expressly incorporated herein by reference in its entirety.

What is claimed is:

1. A magnetic recording medium comprising a nonmagnetic layer comprising a nonmagnetic powder, and at least one magnetic layer comprising a ferromagnetic powder and binder provided on a support in this order, wherein the binder contained in the magnetic layer comprises at least a trifunctional or greater aliphatic acrylate compound having a molecular weight ranging from 250 to 1,000, or a trifunctional or greater aliphatic methacrylate compound having a molecular weight ranging from 250 to 1,000 that has been cured by exposure to radiation, and said compound being employed in a ratio of 5 to 30 mass parts per 100 mass parts of ferromagnetic powder.

2. The magnetic recording medium of claim 1 wherein said magnetic layer has a thickness of 0.05 to 0.4 $\mu$m.

3. The magnetic recording medium of claim 1 wherein said aliphatic acrylate compound is an acrylate obtained by reacting a trifunctional or greater aliphatic alcohol with acrylic acid and said aliphatic methacrylate is a methacrylate obtained by reacting a trifunctional or greater aliphatic alcohol with methacrylic acid.

4. The magnetic recording medium of claim 1 wherein said aliphatic acrylate compound is a trifunctional compound selected from the group consisting of glycerin triacrylate, trimethylolethane triacrylate, trimethylolpropane triacrylate, an ethylene oxide modified triacrylate of trimethylolpropane, pentaerythritol triacrylate, dipentaerythritol triacrylate, propionic acid dipentaerythritol triacrylate, and hydroxypivalylaldehyde-modified dimethylolpropane triacrylate.

5. The magnetic recording medium of claim 1 wherein said aliphatic methacrylate compound is a trifunctional compound selected from the group consisting of glycerin trimethacrylate, trimethylolethane trimethacrylate, trimethylolpropane trimethacrylate, an ethylene oxide modified trimethacrylate of trimethylolpropane, pentaerythritol trimethacrylate, dipentaerythritol trimethacrylate, propionic acid dipentaerythritol trimethacrylate, and hydroxypivalylaldehyde-modified dimethylolpropane trimethacrylate.

6. The magnetic recording medium of claim 1 wherein said aliphatic acrylate compound is a tetrafunctional or greater compound selected from the group consisting of pentaerythritol tetraacrylate, ditrimethylolpropane tetraacrylate, dipentaerythritol tetraacrylate, dipentaerythritol pentaacrylate, dipentaerythritol hexaacrylate, tripentaerythritol octaacrylate, tripentaerythritol heptaacrylate, and tripentaerythritol hexaacrylate.

7. The magnetic recording medium of claim 6, wherein said tetrafunctional or greater aliphatic acrylate compound is pentaerythritol tetraacrylate, dipentaerythritol pentaacrylate or dipentaerythritol hexaacrylate.

8. The magnetic recording medium of claim 1 wherein said aliphatic methacrylate compound is a tetrafunctional or greater compound selected from the group consisting of pentaerythritol tetramethacrylate, ditrimethylolpropane tetramethacrylate, dipentaerythritol tetramethacrylate, dipentaerythritol pentamethacrylate, dipentaerythritol hexamethacrylate, tripentaerythritol octamethacrylate, tripentaerythritol heptamethacrylate, and tripentaerythritol hexamethacrylate.

9. The magnetic recording medium of claim 8 wherein said tetrafunctional or greater aliphatic methacrylate compound is pentaerythritol tetramethacrylate, dipentaerythritol pentamethacrylate or dipentaerythritol hexamethacrylate.

10. A magnetic recording medium comprising a nonmagnetic layer comprising a nonmagnetic powder and at least one magnetic layer comprising a ferromagnetic powder and binder provided on a support in this order, wherein the binder contained in the magnetic layer comprises at least a trifunctional or greater aliphatic acrylate compound having a molecular weight ranging from 250 to 1,000 or a trifunctional or greater aliphatic methacrylate compound having a molecular weight ranging from 250 to 1,000 that has been cured by exposure to radiation followed by heat treatment, said compound being employed in a ratio of 5 to 30 mass parts per 100 mass parts of ferromagnetic powder.

11. The magnetic recording medium of claim 10, wherein said magnetic layer has a thickness of 0.05 to 0.4 $\mu$m.

12. The magnetic recording medium of claim 10, wherein said aliphatic acrylate compound is an acrylate obtained by reacting a trifunctional or greater aliphatic alcohol with acrylic acid and said aliphatic methacrylate is a methacrylate obtained by reacting a trifunctional or greater aliphatic alcohol with methacrylic acid.

13. The magnetic recording medium of claim 10, wherein said aliphatic acrylate compound is a trifunctional compound selected from the group consisting of glycerin triacrylate, trimethylolethane triacrylate, trimethylolpropane triacrylate, an ethylene oxide modified triacrylate of trimethylolpropane, pentaerythritol triacrylate, dipentaerythritol triacrylate, propionic acid dipentaerythritol triacrylate, and hydroxypivalylaldehyde-modified dimethylolpropane triacrylate.

14. The magnetic recording medium of claim 10 wherein said trifunctional aliphatic meth-acrylate compound is a trifunctional compound selected from the group consisting of glycerin trimethacrylate, trimethylolethane trimethacrylate, trimethylolpropane trimethacrylate, an ethylene oxide modified trimethacrylate of trimethylolpropane, pentaerythritol trimethacrylate, dipentaerythritol trimethacrylate, propionic acid dipentaerythritol trimethacrylate, and hydroxypivalylaldehyde-modified dimethylolpropane trimethacrylate.

15. The magnetic recording medium of claim 10, wherein said aliphatic acrylate compound is a tetrafunctional or greater compound selected from the group consisting of pentaerythritol tetraacrylate, ditrimethylolpropane tetraacrylate, dipentaerythritol tetraacrylate, dipentaerythritol pentaacrylate, dipentaerythritol hexaacrylate, tripentaerythritol octaacrylate, tripentaerythritol heptaacrylate, and tripentaerythritol hexaacrylate.

16. The magnetic recording medium of claim 15 wherein said tetrafunctional or greater aliphatic acrylate compound is pentaerythritol tetraacrylate, dipentaerythritol pentaacrylate or dipentaerythritol hexaacrylate.

17. The magnetic recording medium of claim 10 wherein said aliphatic methacrylate compound is a tetrafunctional or greater compound selected from the group consisting of pentaerythritol tetramethacrylate, ditrimethylolpropane tetramethacrylate, dipentaerythritol tetramethacrylate, dipentaerythritol pentamethacrylate, dipentaerythritol hexamethacrylate, tripentaerythritol octamethacrylate, tripentaerythritol heptamethacrylate, and tripentaerythritol hexamethacrylate.

18. The magnetic recording medium of claim 17 wherein said tetrafunctional or greater aliphatic methacrylate compound is pentaerythritol tetramethacrylate, dipentaerythritol pentamethacrylate or dipentaerythritol hexamethacrylate.

* * * * *